US012684084B2

(12) United States Patent　　　(10) Patent No.:　US 12,684,084 B2
Aizawa et al.　　　　　　　　　　(45) Date of Patent:　　　Jul. 14, 2026

(54) MOBILE OBJECT CONTROL DEVICE, METHOD, AND STORAGE MEDIUM FOR GENERATING A TARGET TRAJECTORY

(71) Applicant: HONDA MOTOR CO., LTD., Tokyo (JP)

(72) Inventors: Koki Aizawa, Wako (JP); Hideki Matsunaga, Wako (JP); Takashi Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 73 days.

(21) Appl. No.: 18/070,622

(22) Filed: Nov. 29, 2022

(65) Prior Publication Data

US 2023/0179733 A1　　Jun. 8, 2023

(30) Foreign Application Priority Data

Dec. 2, 2021　　(JP) ................................. 2021-196235

(51) Int. Cl.
　H04N 5/262　　　(2006.01)
　B60K 31/00　　　(2006.01)
(52) U.S. Cl.
　CPC ....... H04N 5/2628 (2013.01); B60K 31/0066 (2013.01)
(58) Field of Classification Search
　CPC ............. H04N 5/2628; B60K 31/0066; B60W 2420/403; B60W 10/04; B60W 10/20
　See application file for complete search history.

(56) References Cited

U.S. PATENT DOCUMENTS 11,370,420 B2 * 6/2022 Yasui ................ B60W 30/0956
11,801,838 B2 * 10/2023 Yu ......................... B60W 10/18
(Continued)

FOREIGN PATENT DOCUMENTS

CN　　107851392　　3/2018
CN　　113525409　　10/2021
(Continued)

OTHER PUBLICATIONS

Japanese Office Action for Japanese Patent Application No. 2021-196235 mailed Aug. 27, 2024.
(Continued)

*Primary Examiner* — David P. Merlino
*Assistant Examiner* — Mahmoud M Kazimi
(74) *Attorney, Agent, or Firm* — Amin, Turocy & Watson, LLP

(57)　　　　　ABSTRACT

Provided is a mobile object control device including a storage medium that stores computer-readable commands and a processor connected to the storage medium, the processor executing the computer-readable commands to: generate a target trajectory indicating a path along which a mobile object is to travel in the future based on division line information represented in a space obtained by converting an image, which is photographed by a camera mounted on the mobile object and represents a surrounding situation of the mobile object, into a bird's-eye view coordinate system; calculate a curvature of the target trajectory; estimate the curvature by applying a correction filter for correcting the curvature to the estimated curvature; generate a speed plan indicating a future target speed of the mobile object based on the corrected curvature; and cause the mobile object to travel according to the speed plan.

5 Claims, 7 Drawing Sheets

(56)                     References Cited

U.S. PATENT DOCUMENTS

| | | | |
|---|---|---|---|
| 12,269,503 B2 * | 4/2025 | Zhang ............... | B60W 50/0097 |
| 2008/0091327 A1 | 4/2008 | Tsuchiya et al. | |
| 2011/0264302 A1 * | 10/2011 | Tsunekawa ......... | B60W 40/072 |
| | | | 701/1 |
| 2012/0215377 A1 | 8/2012 | Takemura et al. | |
| 2016/0314360 A1 * | 10/2016 | Kizumi ................ | G06V 20/588 |
| 2018/0053330 A1 * | 2/2018 | Lee ............................ | G06T 7/80 |
| 2018/0099666 A1 * | 4/2018 | Abe .................... | B60W 40/072 |
| 2018/0238696 A1 | 8/2018 | Takeda | |
| 2018/0345930 A1 * | 12/2018 | Yasui ........................ | B60T 8/72 |
| 2021/0300420 A1 | 9/2021 | Matsunaga | |

FOREIGN PATENT DOCUMENTS

| | | |
|---|---|---|
| JP | 10-103935 | 4/1998 |
| JP | 2005-326164 | 11/2005 |
| JP | 2008-087726 | 4/2008 |
| JP | 2011-065219 X | 3/2011 |
| JP | 2011-073529 | 4/2011 |
| JP | 2011-175572 | 9/2011 |
| JP | 2014-093018 | 5/2014 |
| JP | 2015-016799 | 1/2015 |
| JP | 2018-063524 | 4/2018 |
| JP | 2020-077126 | 5/2020 |
| JP | 2020-192942 | 12/2020 |
| JP | 7208106 B2 * | 1/2023 |

OTHER PUBLICATIONS

Japanese Office Action for Japanese Patent Application No. 2021-196235 mailed Feb. 18, 2015.
Chinese Office Action for Chinese Patent Application No. 202211452664.2 mailed Mar. 23, 2026.

* cited by examiner

OPERATION OF OBJECT
RECOGNITION DEVICE 16

IMAGE

DNN EXTRACTING DIVISION LINE AS POINT CLOUD

POINT CLOUD

CONVERSION INTO POINT CLOUD IN BIRD'S EYE
VIEW COORDINATE SYSTEM

CONVERSION INTO POINT CLOUD
AT EQUAL INTERVALS BY FITTING

MOBILE OBJECT CONTROL DEVICE, METHOD, AND STORAGE MEDIUM FOR GENERATING A TARGET TRAJECTORY

CROSS-REFERENCE TO RELATED APPLICATION

The application is based on Japanese Patent Application No. 2021-196235 filed on Dec. 2, 2021, the content of which incorporated herein by reference.

BACKGROUND

Field of the Invention

The present invention relates to a mobile object control device, a mobile object control method, and a storage medium.

Description of Related Art

Hitherto, the technology of converting an image representing the surrounding situation of a vehicle photographed by an in-vehicle camera into a bird's-eye view coordinate system, and utilizing the information of the bird's-eye view coordinate system to assist in driving of a vehicle is known. For example, Japanese Patent Application Laid-open No. 2020-77126 discloses the technology of displaying a bird's-eye view image of a road, which is created from the image of the in-vehicle camera, on a display.

SUMMARY

The technology disclosed in Japanese Patent Application Laid-open No. 2020-77126 generates a bird's-eye view image for the nearby region of a vehicle for display on a display. However, when the image photographed by a camera is converted into the bird's-eye view coordinate system, the accuracy of information of the bird's-eye view coordinate system deteriorates in some cases as the image becomes away from the camera. As a result, the information of the bird's-eye view coordinate system cannot be utilized preferably for traveling of the vehicle in some cases.

The present invention has been made in view of the above-mentioned circumstances, and has an object to provide a mobile object control device, a mobile object control method, and a storage medium, which are capable of converting an image photographed by a camera into a bird's-eye view coordinate system, and utilizing the information of the bird's-eye view coordinate system preferably for traveling of a mobile object.

A mobile object control device, a mobile object control method, and a storage medium according to the present invention adopt the following configurations.

(1): A mobile object control device according to one aspect of the present invention includes a storage medium that stores computer-readable commands and a processor connected to the storage medium, the processor executing the computer-readable commands to: generate a target trajectory indicating a path along which a mobile object is to travel in the future based on division line information represented in a space obtained by converting an image, which is photographed by a camera mounted on the mobile object and represents a surrounding situation of the mobile object, into a bird's-eye view coordinate system; calculate a curvature of the target trajectory; estimate the curvature by applying a correction filter for correcting the curvature to the estimated curvature; generate a speed plan indicating a future target speed of the mobile object based on the corrected curvature; and cause the mobile object to travel according to the speed plan.

(2): In the aspect (1), the correction filter sets an upper limit value of the curvature.

(3): In the aspect (2), the correction filter sets the upper limit value of the curvature so as to decrease the upper limit value of the curvature for a point on the target trajectory as a distance between the mobile object and the point on the target trajectory becomes larger.

(4): In the aspect (1), the processor generates the speed plan such that a horizontal acceleration of the mobile object is a predetermined value under the condition of the corrected curvature.

(5): In the aspect (1), the processor calculates, when a speed of the mobile object is larger than the target speed, a distance necessary for deceleration from the speed to the target speed, and decelerates the mobile object such that the mobile object reaches the target speed within a range of the calculated distance.

(6): A mobile object control method according to another aspect of the present invention is to be executed by a computer, the mobile object control method including: generating a target trajectory indicating a path along which a mobile object is to travel in the future based on division line information represented in a space obtained by converting an image, which is photographed by a camera mounted on the mobile object and represents a surrounding situation of the mobile object, into a bird's-eye view coordinate system; calculating a curvature of the target trajectory; estimating the curvature by applying a correction filter for correcting the curvature to the estimated curvature; generating a speed plan indicating a future target speed of the mobile object based on the corrected curvature; and causing the mobile object to travel according to the speed plan.

(7): A non-transitory computer-readable storage medium according to another aspect of the present invention stores a program for causing a computer to: generate a target trajectory indicating a path along which a mobile object is to travel in the future based on division line information represented in a space obtained by converting an image, which is photographed by a camera mounted on the mobile object and represents a surrounding situation of the mobile object, into a bird's-eye view coordinate system; calculate a curvature of the target trajectory; estimate the curvature by applying a correction filter for correcting the curvature to the estimated curvature; generate a speed plan indicating a future target speed of the mobile object based on the corrected curvature; and cause the mobile object to travel according to the speed plan.

According to the aspects (1) to (7), it is possible to convert an image photographed by a camera into a bird's-eye view coordinate system, and utilizing the information of the bird's-eye view coordinate system preferably for traveling of a mobile object.

According to the aspect (2) or (3), it is possible to exclude an abnormal value of the curvature that has occurred at the time of converting an image photographed by a camera into a bird's-eye view coordinate system.

According to the aspect (4) or (5), it is possible to cause a mobile object to travel without causing the occupant of the mobile object to feel uncomfortable.

BRIEF DESCRIPTION OF THE DRAWINGS

FIG. 1 is a configuration diagram of a vehicle system that uses a mobile object control device according to an embodiment.

DESCRIPTION OF EMBODIMENTS

Figure 2:
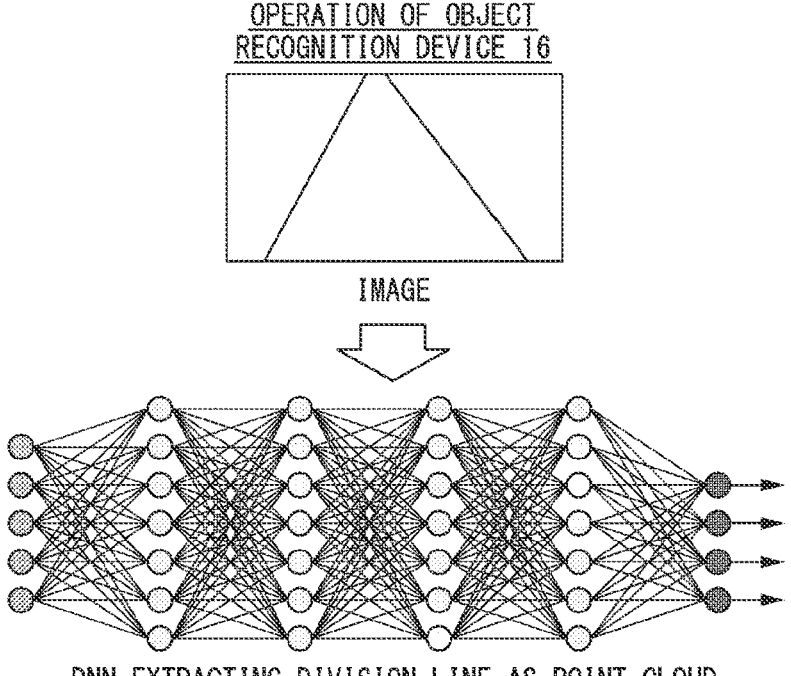
FIG. 2 is a diagram illustrating an example of a method of extracting division line information by an object recognition device.
Figure 2:
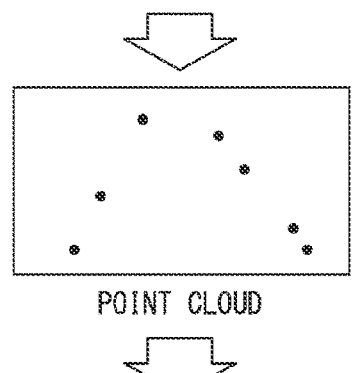
Figure 2:
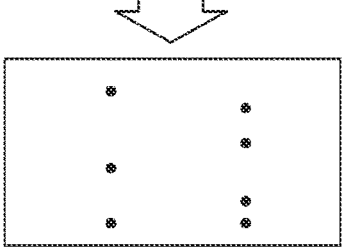
Figure 2:
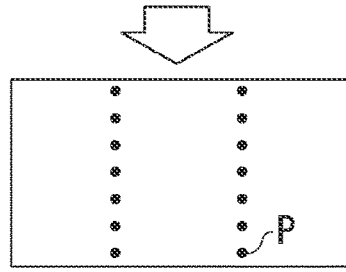

Now, referring to the drawings, description is given of a mobile object control device, a mobile object control method, and a storage medium according to an embodiment of the present invention. The mobile object control device is a device for controlling movement of a mobile object. The mobile object includes, for example, a vehicle such as a three-wheeled vehicle or a four-wheeled vehicle, a two-wheeled vehicle, a micro mobility, and may include any type of mobile object that accommodates, for example, a person (occupant) and is capable of moving on a road surface including a road lane. In the following description, it is assumed that the mobile object is a four-wheeled vehicle, and a vehicle having a driving assistance device mounted thereon is referred to as a subject vehicle M.

[Overall Configuration]

Figure 1:
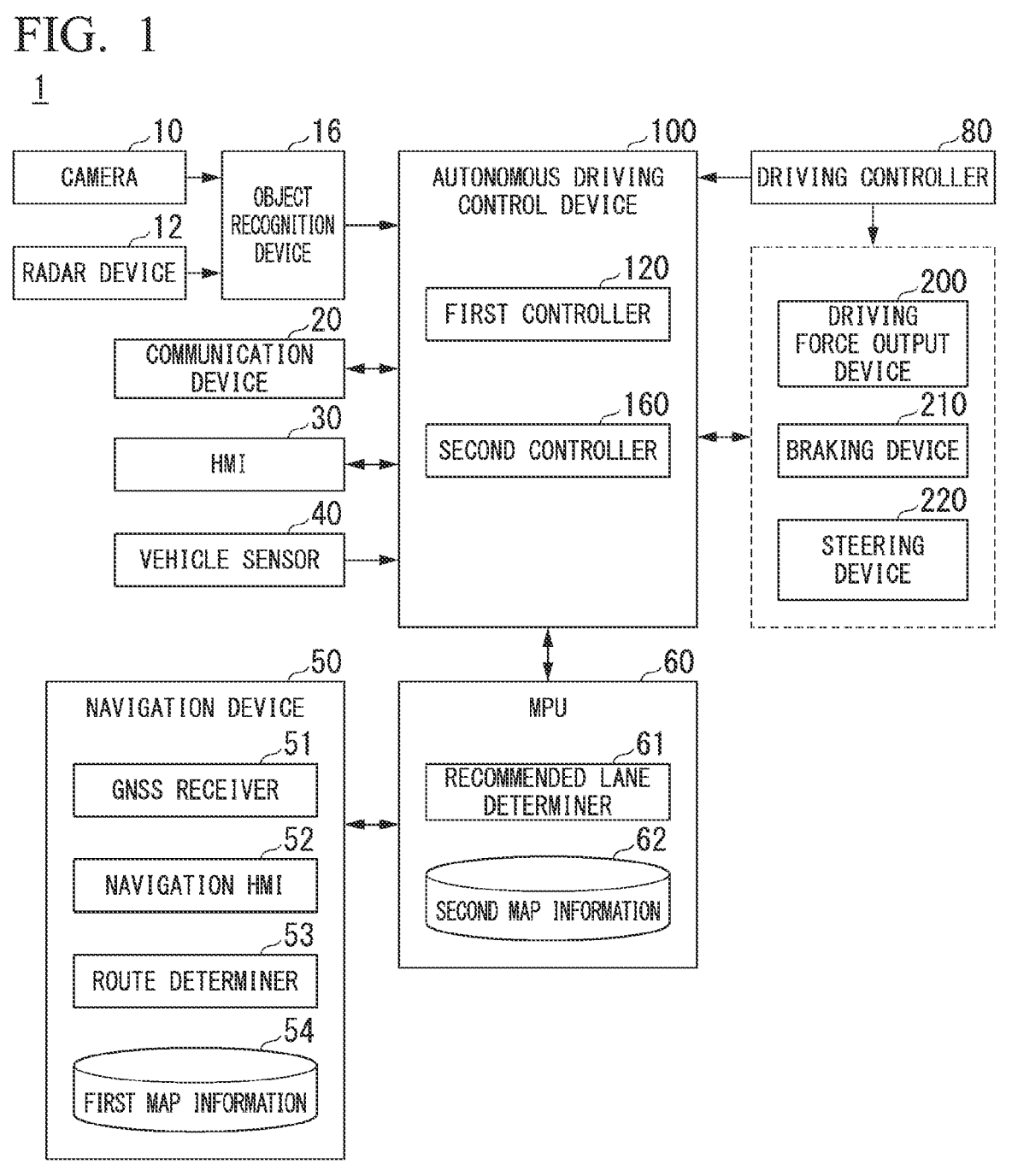

FIG. 1 is a configuration diagram of a vehicle system 1 that uses the mobile object control device according to an embodiment. The power source of the vehicle having the vehicle system 1 mounted thereon is an internal combustion engine such as a diesel engine or a gasoline engine, an electric motor, or a combination thereof. The electric motor operates by using power generated by a generator connected to the internal combustion engine or power discharged by a secondary battery or a fuel cell.

The vehicle system 1 includes, for example, a camera 10, a radar device 12, an object recognition device 16, a communication device 20, an HMI (Human Machine Interface) 30, a vehicle sensor 40, a navigation device 50, an MPU (Map Positioning Unit) 60, a driving controller 80, an autonomous driving control device 100, a driving force output device 200, a braking device 210, and a steering device 220. These devices and instruments are connected to one another via, for example, a wireless communication line, a serial communication line, or a multiplex communication line such as a CAN (Controller Area Network) communication line. The configuration illustrated in FIG. 1 is only one example, and a part of the configuration may be omitted, or another configuration may be added thereto.

The camera 10 is, for example, a digital camera that uses a solid image pickup device such as a CCD (Charge Coupled Device) or a CMOS (Complementary Metal Oxide Semiconductor). The camera 10 is mounted on any part of a vehicle (hereinafter referred to as "subject vehicle M") having the vehicle system 1 mounted thereon. When the camera 10 picks up a front image, the camera 10 is mounted on, for example, an upper part of a front windshield or a back surface of a rear-view mirror. The camera 10 repeatedly photographs the surroundings of the subject vehicle M periodically, for example. The camera 10 may be a stereo camera.

The radar device 12 radiates a radio wave such as a millimeter wave toward the surroundings of the subject vehicle M, and detects a radio wave (reflected wave) reflected by an object, to detect at least the position (distance and direction) of the object. The radar device 12 is mounted on any part of the own vehicle M. The radar device 12 may detect the position and speed of the object by an FM-CW (Frequency Modulated Continuous Wave) method.

The object recognition device 16 analyzes an image representing the front situation of the subject vehicle M photographed by the camera 10 to extract necessary information. Then, the object recognition device 16 executes sensor fusion processing for results of detection by the camera 10 and the radar device 12, to thereby recognize a position, a type, and a speed of an object. The object recognition device 16 outputs the recognition result to the autonomous driving control device 100. In the present invention, the radar device 12 may be omitted, and in that case, the object recognition device 16 may have only the function of analyzing an image. Further, sensor fusion processing may not be executed, and the object recognition device 16 may output the result of detection by the radar device 12 to the autonomous driving control device 100 as it is.

The object recognition device 16 extracts information (hereinafter referred to as "division line information") on a division line along which the subject vehicle M is traveling based on an image photographed by the camera 10. FIG. 2 is a diagram illustrating an example of a method of extracting division line information by the object recognition device 16. First, the object recognition device 16 inputs an image representing the front situation of the subject vehicle M photographed by the camera 10 into a trained model such as a deep neural network (DNN), which is trained so as to receive an image and output a division line included in the image as a point cloud, to thereby extract a point cloud representing the division line. The point cloud extracted in this case is a point cloud defined in a camera coordinate system.

Next, the object recognition device 16 uses a known method to convert the extracted point cloud in the camera coordinate system into a point cloud in a bird's-eye view coordinate system. The point cloud obtained through this convert action is arranged irregularly. Thus, the object recognition device 16 uses, for example, function fitting using a quadratic curve or the like to convert the point cloud arranged irregularly in the bird's-eye view coordinate system into a point cloud P arranged at equal intervals (for example, 1 m interval). As a result, the object recognition device 16 acquires, as the division line information, the point cloud P arranged at equal intervals and representing the division line in the bird's-eye view coordinate system.

Figure 3:
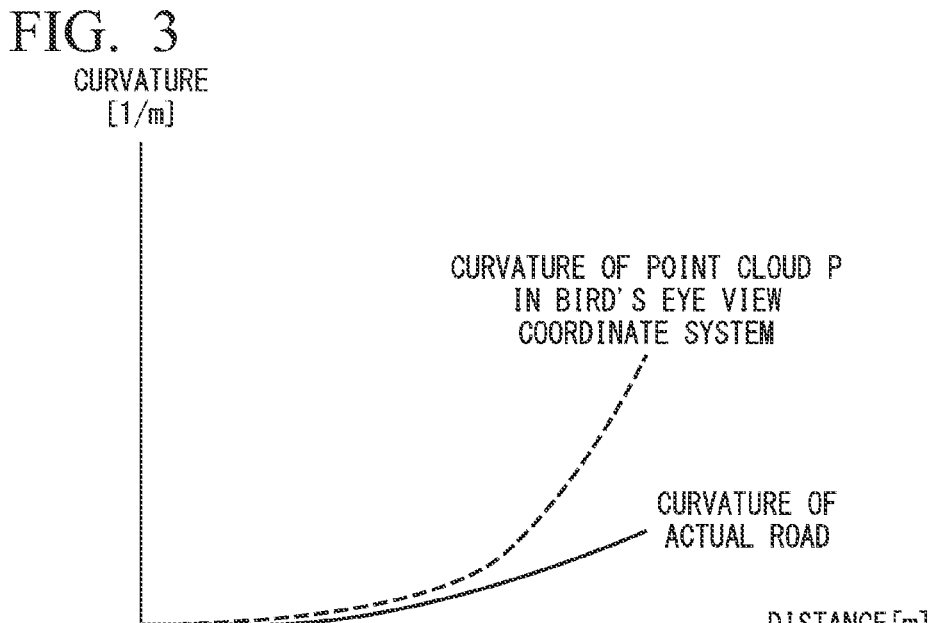
FIG. 3 is a graph for describing the characteristics of a point cloud being the division line information acquired by the object recognition device.

FIG. 3 is a graph for describing the characteristics of the point cloud being the division line information acquired by the object recognition device 16. In the graph of FIG. 3, the horizontal axis represents a distance from the subject vehicle M to each point forming the point cloud P, and the longitudinal axis represents the curvature of the point cloud P. The dotted line of FIG. 3 represents the curvature of the point cloud P in the bird's-eye view coordinate system, and the solid line of FIG. 3 represents the curvature of an actual road. As can be understood from FIG. 3, the curvature of the point cloud P in the bird's-eye view coordinate system has a small deviation from the curvature of the actual road when the distance from the subject vehicle M is small, whereas the curvature of the point cloud P in the bird's-eye view coordinate system has a large deviation from the curvature of the actual road when the distance from the subject vehicle M is large.

Thus, in general, in autonomous driving or acceleration/deceleration assist traveling, when the speed plan of the subject vehicle M is generated based on the point cloud P converted from the camera coordinate system into the bird's-eye view coordinate system, the subject vehicle M is expected to be decelerated excessively due to excessive evaluation of the curvature of the road. As a result, the occupant of the subject vehicle M may feel strange or uncomfortable for excessive deceleration of the subject vehicle M. As described later, the autonomous driving control device 100 according to this embodiment solves this problem. The image recognition feature of the object recognition device 16 may be mounted in the autonomous driving control device 100.

The communication device 20 uses, for example, a cellular network, a Wi-Fi network, Bluetooth (trademark), or DSRC (Dedicated Short Range Communication) to communicate with another vehicle present near the subject vehicle M or communicate with various kinds of server devices via a wireless base station.

The vehicle sensor 40 includes a vehicle speed sensor that detects the speed of the subject vehicle M, an acceleration sensor that detects an acceleration, a yaw rate sensor that detects an angular speed around a vertical axis, an azimuth sensor that detects the orientation of the subject vehicle M, and other sensors.

The navigation device 50 includes, for example, a GNSS (Global Navigation Satellite System) receiver 51, a navigation HMI 52, and a route determination unit 53. The navigation device 50 stores first map information 54 in a storage device such as a hard disk drive (HDD) or a flash memory. The GNSS receiver 51 identifies the position of the subject vehicle M based on a signal received from a GNSS satellite. The position of the subject vehicle M may be identified or supplemented by an inertial navigation system (INS) using the output of the vehicle sensor 40. The navigation HMI 52 includes, for example, a display device, a speaker, a touch panel, and a key. The navigation HMI 52 and the above-mentioned HMI 30 may be integrated partially or totally. The route determination unit 53 refers to the first map information 54 to determine a route (hereinafter referred to as "map route") from the position (or any input position) of the subject vehicle M identified by the GNSS receiver 51. The first map information 54 is information representing road structure by a link indicating a road and a node connected by the links, for example. The first map information 54 may include the curvature of a road or POI (Point Of Interest) information, for example. The map route is output to the MPU 60. The navigation device 50 may provide route guidance using the navigation HMI 52 based on the map route. The navigation device 50 may be implemented by the function of a terminal device such as a smartphone or tablet terminal held by the occupant, for example. The navigation device 50 may transmit the current location and destination to a navigation server via the communication device 20, and acquire a route equivalent to the map route from the navigation server.

The MPU 60 includes, for example, a recommended lane determination unit 61, and stores second map information 62 in a storage device such as the HDD or the flash memory. The recommended lane determination unit 61 divides the map route provided by the navigation device 50 into a plurality of blocks (for example, in units of 100 [m] along the vehicle traveling direction), and determines a recommended lane for each block by referring to the second map information 62. The recommended lane determination unit 61 determines along which lane from the left the subject vehicle M is going to travel. When there is a branch on the map route, the recommended lane determination unit 61 determines a recommended lane such that the subject vehicle M can travel along a route efficient for entering the branch.

The second map information 62 is map information more precise than the first map information 54. The second map information 62 includes, for example, information on the center of a lane or information on the boundary of a lane. Further, the second map information 62 may include road information, traffic regulation information, address information (address/postal code), facility information, and phone number information. The second map information 62 may be updated as appropriate through communication between the communication device 20 and another device.

The driving controller 80 includes, for example, an acceleration pedal, a brake pedal, a shift lever, a steering wheel, a deformed steering wheel, a joystick, and other controllers. A sensor for detecting the operation amount or whether or not an operation is performed is mounted to the driving controller 80, and the detection result is output to a part or all of the autonomous driving control device 100, the driving force output device 200, the braking device 210, and the steering device 220.

Prior to the description of the autonomous driving control device 100, description is given of the driving force output device 200, the braking device 210, and the steering device 220. The driving force output device 200 outputs, to drive wheels, a driving force (torque) for causing the subject vehicle M to travel. The driving force output device 200 includes, for example, a combination of an internal combustion engine, an electric motor, a transmission, and the like, and a power ECU (Electronic Control Unit) for controlling these components. The power ECU controls the above-mentioned components according to information input from the autonomous driving control device 100 or information input from the driving controller 80.

The braking device 210 includes, for example, a brake caliper, a cylinder for transmitting hydraulic pressure to the brake caliper, an electric motor for causing hydraulic pressure in the cylinder, and a brake ECU. The brake ECU controls the electric motor according to information input from the autonomous driving control device 100 or information input from the driving controller 80, and causes a brake torque that depends on a braking operation to be output to each wheel.

The steering device 220 includes, for example, a steering ECU and an electric motor. The electric motor applies a force to a rack and pinion mechanism to change the orientation of a steered wheel, for example. The steering ECU drives the electric motor to change the orientation of the steered wheel according to information input from the autonomous driving control device 100 or information input from the driving controller 80.

The autonomous driving control device 100 includes, for example, a first control unit 120 and a second control unit 160. The first control unit 120 and the second control unit 160 are implemented by a hardware processor such as a CPU (Central Processing Unit) executing a program (software), for example. A part or all of these components may be implemented by hardware (circuit unit including circuitry) such as an LSI (Large Scale Integration), an ASIC (Application Specific Integrated Circuit), an FPGA (Field-Programmable Gate Array), or a GPU (Graphics Processing Unit), or may be implemented through cooperation between software and hardware. The program may be stored in a storage device (storage device including non-transitory storage medium) such as an HDD or flash memory in advance, or may be stored in a removable storage medium such as a DVD or CD-ROM and the storage medium (non-transitory storage medium) may be attached to a drive device to install the program into the HDD or flash memory of the autonomous driving control device 100. The autonomous driving control device 100 is an example of "mobile object control device".

[Configuration of Autonomous Driving Control Device 100]

Figure 4:
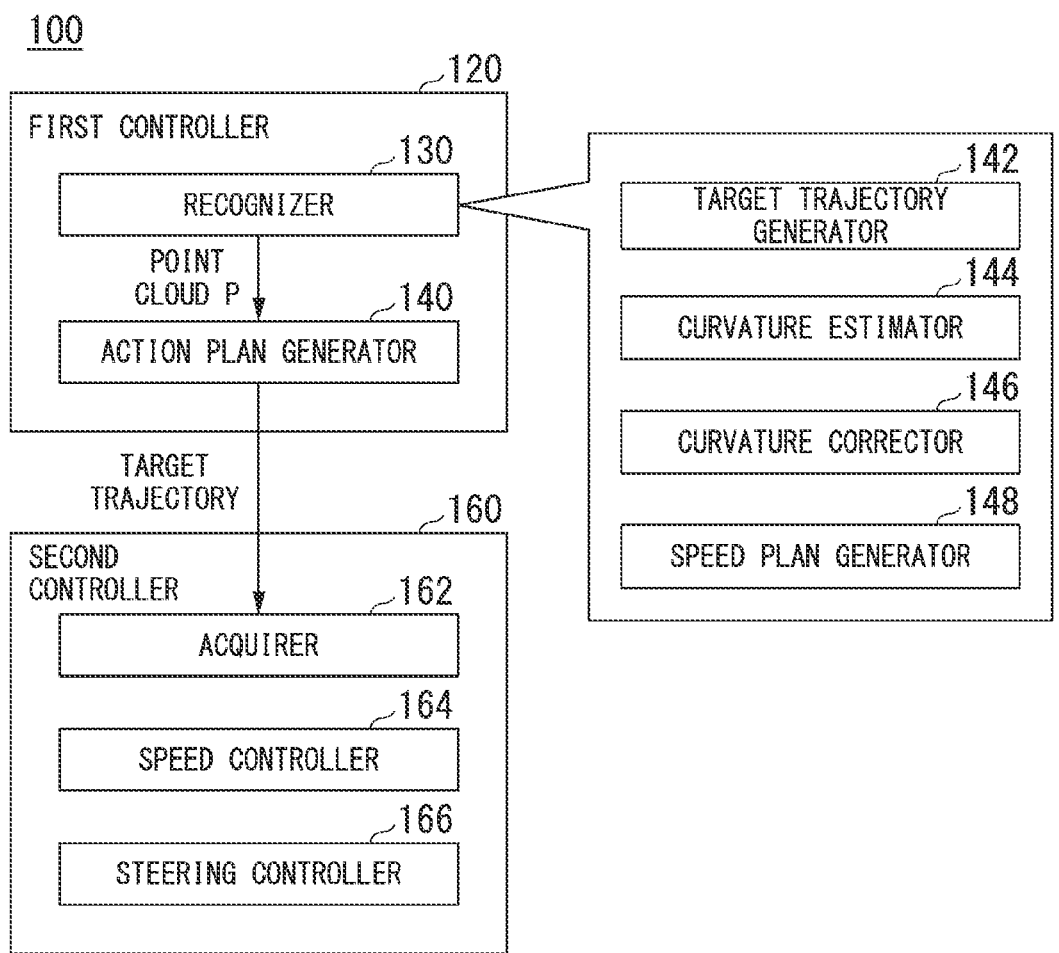
FIG. 4 is a functional configuration diagram of a first control unit and a second control unit included in an autonomous driving control device.

FIG. 4 is a functional configuration diagram of the first control unit 120 and the second control unit 160 included in the autonomous driving control device 100. The first control unit 120 includes, for example, a recognition unit 130 and an action plan generation unit 140. The action plan generation unit 140 includes, for example, a target trajectory generation unit 142, a curvature estimation unit 144, a curvature correction unit 146, and a speed plan generation unit 148.

The recognition unit 130 uses information input from the camera 10 and the radar device 12 via the object recognition device 16 to recognize the state of an object near the subject vehicle M such as a position, a speed, and an acceleration. In particular, the recognition unit 130 acquires the point cloud P representing road division lines from the object recognition device 16, and recognizes a region surrounded by the acquired point cloud P as a lane (travel lane) in which the subject vehicle M is traveling.

Figure 5:
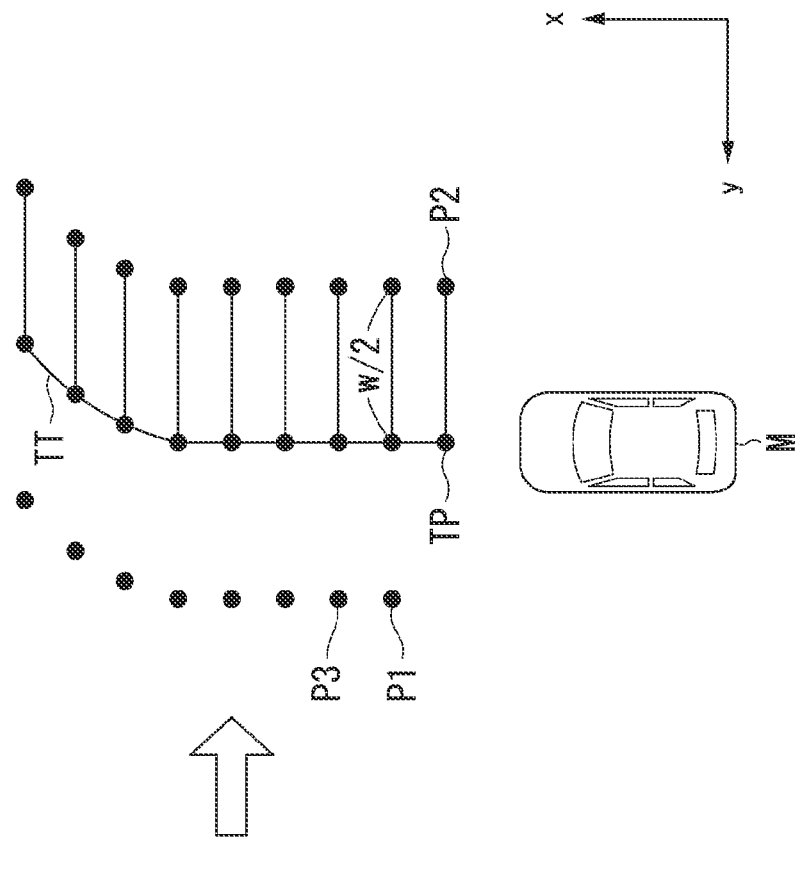
FIG. 5 is a diagram for describing an example of a method of generating a target trajectory by a target trajectory generation unit.
Figure 5:
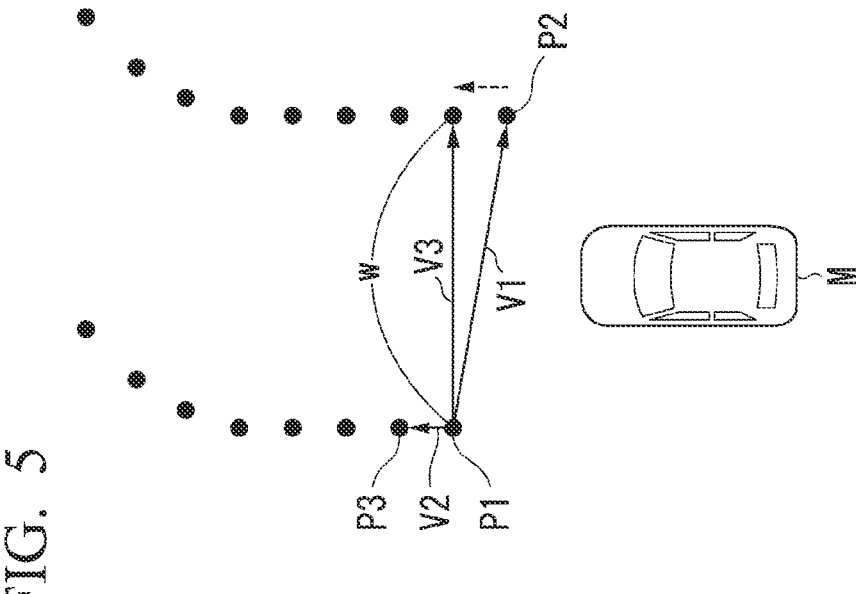

The target trajectory generation unit 142 generates a target trajectory TT indicating a path along which the subject vehicle M is to travel in the future based on the point cloud P acquired from the object recognition device 16. FIG. 5 is a diagram for describing an example of the method of generating the target trajectory TT by the target trajectory generation unit 142. First, the target trajectory generation unit 142 sets, as a start point, a point P1 closest to the subject vehicle M of the point cloud P representing a road division line on one side, and sets, as an end point, a point P2 closest to the subject vehicle M of the point cloud P representing a road division line on the other side, to thereby obtain a vector V1 from the start point to the end point. In the example of FIG. 5, the target trajectory generation unit 142 sets, as a start point, a point P1 closest to the subject vehicle M of the point cloud P representing a road division line on the left side, and sets, as an end point, a point P2 closest to the subject vehicle M of the point cloud P representing a road division line on the right side, to thereby obtain a vector V1 from the start point to the end point. However, the vector V1 may be an inverse vector.

Next, the target trajectory generation unit 142 acquires a point P3 second closest to the subject vehicle M among the point cloud P representing the road division line on the left side and the point cloud P representing the road division line on the right side. In FIG. 5, the target trajectory generation unit 142 acquires a point P3 second closest to the subject vehicle M of the point cloud P representing the road division line on the left side. Next, the target trajectory generation unit 142 calculates a unit vector V2' of a vector V2 from the point P1 serving as a start point to the point P3 serving as an end point, and rotates the calculated unit vector V2' by −90 degrees to obtain a unit vector V2". The target trajectory generation unit 142 acquires an orthogonal projection vector V3 of the vector V1 with respect to the unit vector V2", and estimates the magnitude of the orthogonal projection vector V3 as a width w of the road on which the subject vehicle M is traveling. In other words, the target trajectory generation unit 142 calculates an orthogonal projection vector of the vector V1 with respect to the unit vector in the normal direction of the road division line passing through the point P1.

Next, the target trajectory generation unit 142 determines which of the point cloud P representing the road division line on the left side and the point cloud P representing the road division line on the right side has a higher recognition accuracy. More specifically, for example, the target trajectory generation unit 142 determines which of the point cloud P representing the road division line on the left side and the point cloud P representing the road division line on the right side has a higher recognition accuracy based on whether or not tracking of the point cloud P is successful, the number of times of recognizing the point cloud P, and the length of the line connecting the point cloud P. In the situation illustrated in the left part of FIG. 5, it is detected that the line connecting the point cloud P representing the road division line on the right side is longer than the line representing the road division line on the left side, and thus the target trajectory generation unit 142 determines that the point cloud P representing the road division line on the right side has a higher recognition accuracy.

Next, as illustrated in the right part of FIG. 5, the target trajectory generation unit 142 generates the target trajectory TT by offsetting half the length w/2 of the estimated road width w in the normal direction of the road division line with the road division line on the side of higher recognition accuracy serving as a reference. More specifically, the target trajectory generation unit 142 acquires points TP, which are obtained by offsetting the points of the point cloud P on the side of higher recognition accuracy in the normal direction of the road division line by half the length w/2 of the estimated road width w, and connects the points TP to generate the target trajectory TT.

In the example of FIG. 5, description has been given of a case in which both of the point cloud P representing the road division line on the left side and the point cloud P representing the road division line on the right side are recognized. However, if either one of the point cloud P representing the road division line on the left side and the point cloud P representing the road division line on the right side has failed to be recognized, the point cloud P acquired immediately before failure of recognition and the width w of the road w estimated at that time are used to generate the target trajectory TT by using the above-mentioned method with the point cloud P on the other side serving as a reference. As a result, it is possible to generate the target trajectory TT even if either one of the point cloud P representing the road division line on the left side and the point cloud P representing the road division line on the right side has failed to be recognized.

The curvature estimation unit 144 estimates the curvature of the target trajectory TT generated by the target trajectory generation unit 142. More specifically, the curvature estimation unit 144 estimates the curvature of the target trajectory TT by calculating the curvature of each point TP of the target trajectory TT according to the following expression (1) when the front/back direction of the subject vehicle M is defined as an x axis, the left/right direction of the subject vehicle M is defined as a y axis, and the distance from the subject vehicle M is represented by s. The curvature estimation unit 144 calculates expression (1) by using a numerical analysis technique such as a central difference scheme. In expression (1), $\kappa(s)$ represents the curvature of the point TP at the position of the distance s from the subject vehicle M, and $R(s)$ represents the curvature radius of the point TP at the position of the distance s from the subject vehicle M. As described above, the point cloud P representing the road division line in the bird's-eye view coordinate system is set at equal intervals, and thus each point TP of the target trajectory TT obtained by offsetting the point cloud P is also set at equal intervals, with the result that a numerical analysis technique such as a central difference scheme can be applied.

$$\kappa(s) = \frac{1}{R(s)} = \frac{\left| \frac{dx}{ds} \frac{d^2y}{ds^2} - \frac{dy}{ds} \frac{d^2x}{ds^2} \right|}{\left\{ \left( \frac{dx}{ds} \right)^2 + \left( \frac{dy}{ds} \right)^2 \right\}^{\frac{3}{2}}} \qquad (1)$$

Figure 6:
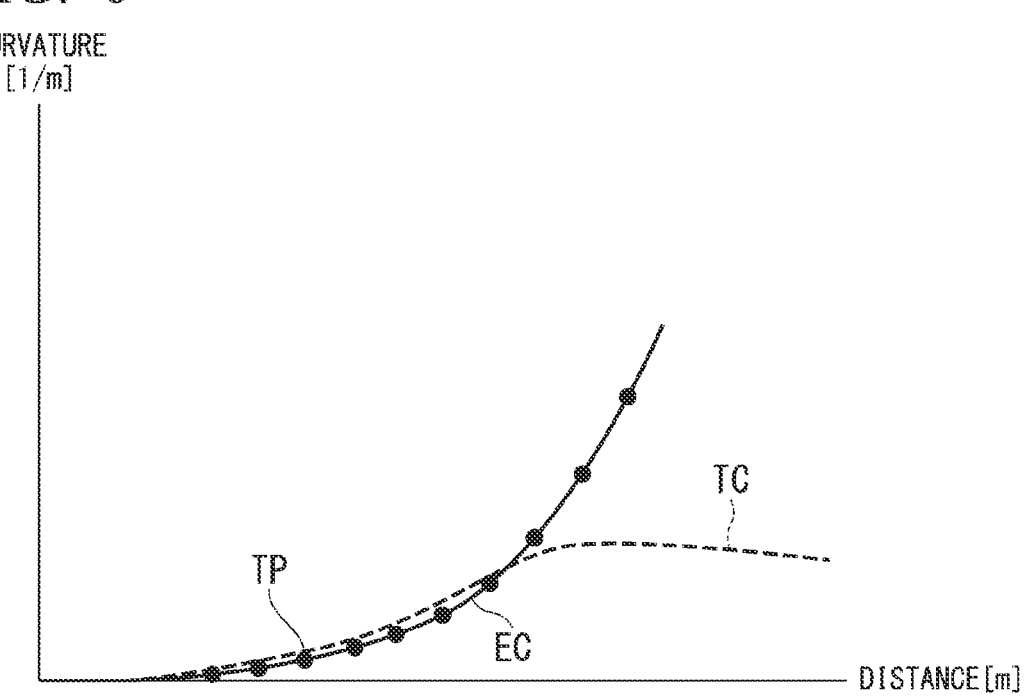
FIG. 6 is a graph showing an example of an estimated curvature of the target trajectory calculated by a curvature estimation unit.

FIG. 6 is a graph showing an example of the estimated curvature EC of the target trajectory TT calculated by the curvature estimation unit 144. In FIG. 6, the solid line indicated by EC represents the estimated curvature of the target trajectory TT estimated by the curvature estimation unit 144, and the dotted line indicated by TC represents the true curvature of the road in which the subject vehicle M is traveling. In this manner, the estimated curvature EC of the target trajectory TT set based on the point cloud P converted from the camera coordinate system into the bird's-eye view coordinate system tends to have a larger error as the distance from the subject vehicle M becomes larger. As a result, if the subject vehicle M is decelerated according to the speed plan based on the estimated curvature EC, the occupant of the subject vehicle M my feel strange or uncomfortable for excessive deceleration of the subject vehicle M.

In view of the above-mentioned circumstances, the curvature correction unit 146 corrects the estimated curvature EC by applying a correction filter for correcting the curvature to the estimated curvature EC estimated by the curvature estimation unit 144. More specifically, the curvature correction unit 146 applies a correction filter for setting the upper limit value of the estimated curvature EC so as to decrease the upper limit value of the curvature at the point TP as the distance between the subject vehicle M and the point TP of the target trajectory TT becomes larger.

Figure 7:
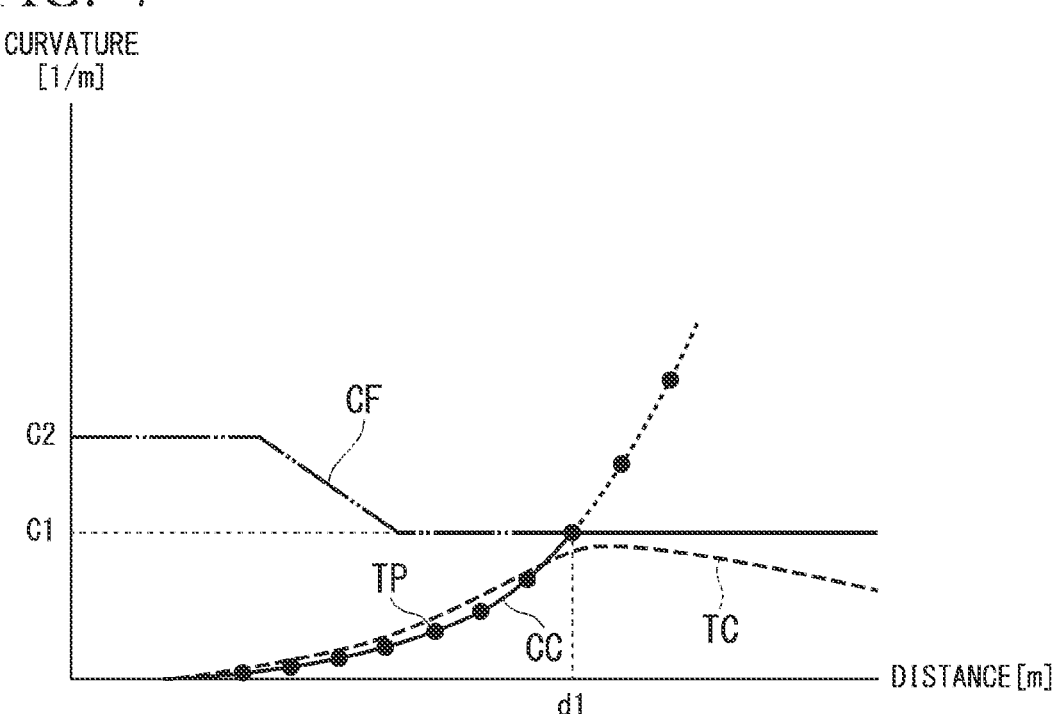
FIG. 7 is a graph showing an example of a corrected curvature of the target trajectory corrected by a curvature correction unit.

FIG. 7 is a graph showing an example of the corrected curvature CC of the target trajectory TT corrected by the curvature correction unit 146. In FIG. 7, the two-dotted line indicated by CF represents the correction filter, and the solid line indicated by CC represents the corrected curvature CC of the target trajectory TT corrected by the curvature correction unit 146. As shown in FIG. 7, when the distance s from the subject vehicle M falls within a predetermined value d1, the value of the estimated curvature EC falls below a set value of the correction filter CF, and the value of the corrected curvature CC matches the value of the estimated curvature EC.

On the other hand, when the distance s from the subject vehicle M exceeds the predetermined value d1, the value of the estimated curvature EC exceeds the set value of the correction filter CF, and thus the curvature correction unit 146 applies the correction filter CF to limit the value of the estimated curvature EC to the upper limit value C1 and obtain the corrected curvature CC. In this manner, it is possible to correct only the estimated curvature EC that is expected to have a larger error by setting the upper limit value of the estimated curvature EC smaller as the distance between the subject vehicle M and the point TP of the target trajectory TT becomes larger.

The speed plan generation unit 148 generates a speed plan indicating the future target speed of the subject vehicle M based on the corrected curvature CC corrected by the curvature correction unit 146. More specifically, the speed plan generation unit 148 generates such a speed plan that the lateral acceleration of the subject vehicle M is equal to a predetermined value G that does not cause the occupant to feel uncomfortable under the condition of the corrected curvature CC. The speed plan generation unit 148 deforms the equation of the lateral acceleration $v^2/R = v^2\kappa = G$ to generate a speed plan such that the subject vehicle M travels at a speed indicated by the following expression (2). In this embodiment, for the sake of convenience, the horizontal acceleration is calculated by constructing an equation such that the horizontal acceleration of the subject vehicle M is equal to the predetermined value G. However, the predetermined value G in this case is not limited to a specific value, and the predetermined value G may be set to any value within the range that prevents the occupant from feeling uncomfortable or strange.

$$v = \sqrt{\frac{const}{\kappa}} \qquad (2)$$

Figure 8:
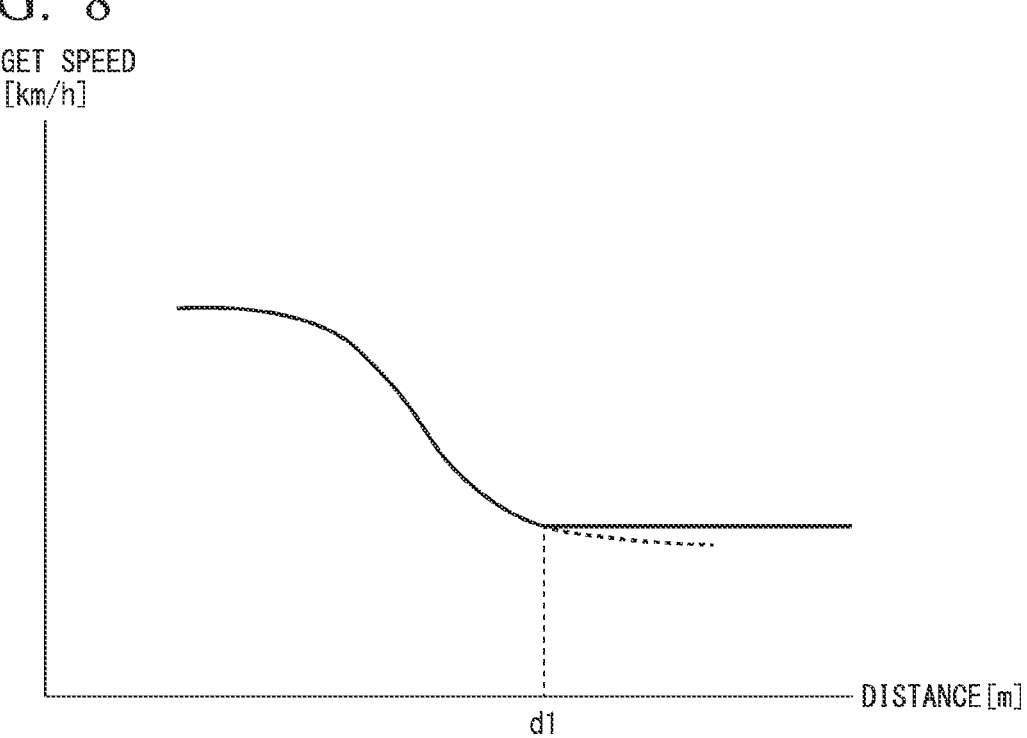
FIG. 8 is a diagram illustrating an example of a speed plan generated by a speed plan generation unit.

FIG. 8 is a diagram illustrating an example of the speed plan generated by the speed plan generation unit 148. The speed plan shown in FIG. 8 is generated by the speed plan generation unit 148 for the corrected curvature CC shown in FIG. 7. As shown in FIG. 8, when the distance s from the subject vehicle M follows within the range of the predetermined value d1, the target speed of the subject vehicle M decreases as the distance s from the subject vehicle M becomes larger. This is because as the distance s from the subject vehicle M becomes larger, the corrected curvature CC shown in FIG. 7 also becomes larger (that is, it is expected that there is a curve in front of the subject vehicle M).

However, when the distance s from the subject vehicle M is larger than the predetermined value d1, the corrected curvature shown in FIG. 7 takes a constant value, and thus the target speed calculated based on the corrected curvature CC also takes a constant value. With such processing, it is possible to suppress excessive deceleration of the subject vehicle M due to the fact that the curvature of the point cloud P converted into the bird's-eye view coordinate system is evaluated excessively as the distance from the subject vehicle M becomes larger.

Figure 9:
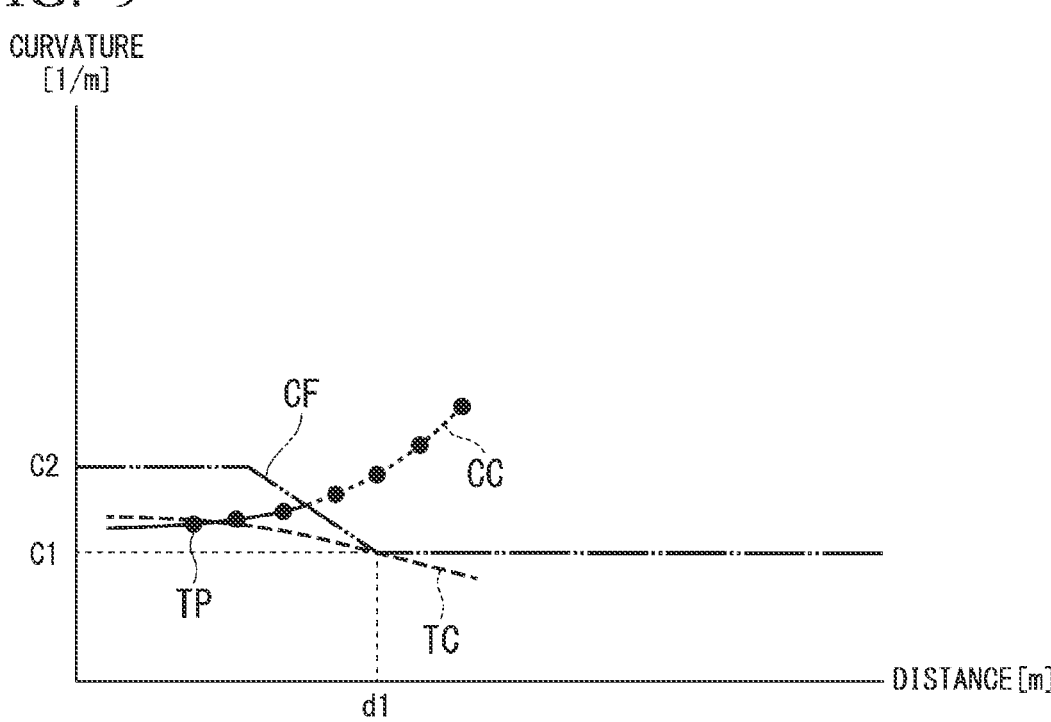
FIG. 9 is a graph showing an example of the corrected curvature of the target trajectory corrected by the curvature correction unit when a subject vehicle is traveling on a curve.

FIG. 9 is a graph showing an example of the corrected curvature CC of the target trajectory TT corrected by the curvature correction unit 146 when the subject vehicle M is traveling on a curve. As shown in FIG. 9, the estimated curvature EC of the target trajectory TT exceeds the above-mentioned upper limit value C1 within the range in which the distance s from the subject vehicle M is equal to or smaller than the predetermined value d1, but the accuracy of estimating the curvature at the position close to the subject vehicle M is expected to be high, and thus the curvature correction unit 146 applies the higher upper limit value C2 to the estimated curvature EC. That is, the curvature correction unit 146 applies a smaller upper limit value as the correction filter when the distance s from the subject vehicle M is large, whereas the curvature correction unit 146 applies a larger upper limit value as the correction filter when the distance s from the subject vehicle M is small, with the result that it is possible to utilize the estimated curvature EC expected to have a small error for generation of a speed plan while correcting the estimated curvature EC expected to have a large error.

Referring back to FIG. 4, the second control unit 160 controls the driving force output device 200, the braking device 210, and the steering device 220 such that the subject vehicle M passes through the target trajectory TT generated by the action plan generation unit 140 according to the speed plan generated by the speed plan generation unit 148.

The second control unit 160 includes, for example, an acquirer 162, a speed controller 164, and a steering controller 166. The acquirer 162 acquires information on the target trajectory (trajectory points) generated by the action plan generation unit 140, and stores the information into a memory (not shown). When the current speed of the subject vehicle M is larger than the target speed generated by the speed plan generation unit 148, the speed controller 164 calculates a distance necessary for deceleration from the current speed to the target speed, and decelerates the subject vehicle M such that the subject vehicle M reaches the target speed within the range of the calculated distance. The steering controller 166 controls the steering device 220 according to the degree of curve of the target trajectory stored in the memory.

[Flow of Processing]

Figure 10:
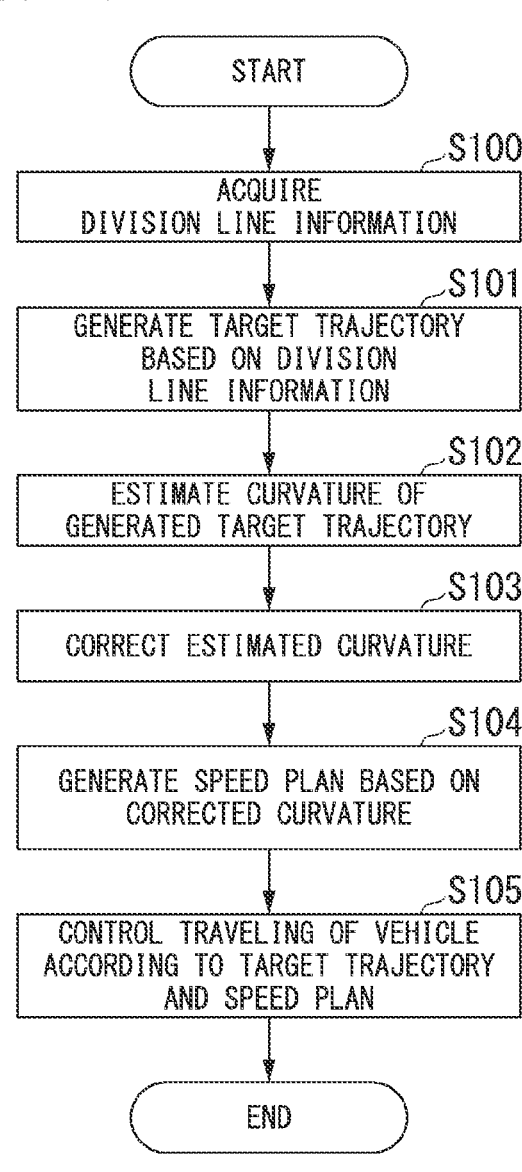
FIG. 10 is a diagram illustrating an example of a flow of processing to be executed by the autonomous driving control device.

Next, referring to FIG. 10, description is given of a flow of processing to be executed by the autonomous driving control device 100. FIG. 10 is a diagram illustrating an example of the flow of processing to be executed by the autonomous driving control device 100. First, the recognition unit 130 acquires the point cloud P representing a division line in the bird's-eye view coordinate system from the object recognition device 16 (Step S100). Next, the target trajectory generation unit 142 generates the target trajectory TT of the subject vehicle M based on the acquired point cloud P (Step S101).

Next, the curvature estimation unit 144 estimates the curvature of the generated target trajectory TT (Step S102). Next, the curvature correction unit 146 applies the correction filter to the estimated curvature to correct the curvature (Step S103). Next, the speed plan generation unit 148 generates a speed plan indicating the future target speed of the subject vehicle M based on the corrected curvature (Step S104). Next, the second control unit 160 causes the subject vehicle M to travel according to the target trajectory TT generated by the target trajectory generation unit 142 and the speed plan generated by the speed plan generation unit 148 (Step S105). In this manner, the processing of this flow chart is finished.

In the embodiment described above, description has been given of an example in which the autonomous driving control device 100 causes the subject vehicle M to travel autonomously according to the speed plan generated by the speed plan generation unit 148. However, the present invention is not limited to such a configuration, and can be applied to assisted driving for the driver. For example, when the subject vehicle M manually driven by the driver is traveling on a curve and the driver has applied the braking device 210, the autonomous driving control device 100 may assist in deceleration by operating the braking device 210 such that the current speed of the subject vehicle M reaches the target speed indicated by the speed plan generated by the speed plan generation unit 148. Further, for example, when the subject vehicle M manually driven by the driver is traveling on a curve and a deviation between the current speed and the target speed indicated by the speed plan is equal to or larger than a threshold value, the autonomous driving control device 100 may operate the braking device 210 such that the current speed approaches the target speed without application of the braking device 210 by the driver.

According to the embodiment described above, the target trajectory of the subject vehicle M is generated based on division line information represented in a space obtained by converting an image photographed by a camera into a bird's-eye view coordinate system, the curvature of the generated target trajectory is estimated and corrected, the speed plan of the subject vehicle M is generated based on the corrected curvature, and the subject vehicle M is caused to travel according to the generated speed plan. As a result, it is possible to preferably utilize information, which is converted from the image photographed by a camera into the bird's-eye view coordinate system, for traveling of a mobile object.

The above-mentioned embodiment can be represented in the following way.

A mobile object control device including a storage medium that stores computer-readable commands and a processor connected to the storage medium, the processor executing the computer-readable commands to: generate a target trajectory indicating a path along which a mobile object is to travel in the future based on division line information represented in a space obtained by converting an image, which is photographed by a camera mounted on the mobile object and represents a surrounding situation of the mobile object, into a bird's-eye view coordinate system; calculate a curvature of the target trajectory; estimate the curvature by applying a correction filter for correcting the curvature to the estimated curvature; generate a speed plan indicating a future target speed of the mobile object based on the corrected curvature; and cause the mobile object to travel according to the speed plan.

This concludes the description of a mode for carrying out the present invention based on the embodiment. The present invention is not limited to the above-mentioned embodiment, and various modifications and substitutions can be made within a range not departing from the gist of the present invention.

What is claimed is:

1. A mobile object control device comprising a storage medium that stores computer-readable commands and a processor connected to the storage medium, the processor executing the computer-readable commands to:

generate a target trajectory indicating a path along which a mobile object is to travel in the future based on division line information represented in a space obtained by converting a camera-coordinate system image, which is photographed by a camera mounted on the mobile object and represents a surrounding situation of the mobile object, into a bird's-eye view coordinate system image;

calculate, as a calculated curvature, a first curvature of the target trajectory;

estimate, as an estimated curvature, a second curvature by applying a correction filter for correcting an error of the calculated curvature to the estimated curvature, the error being caused by conversion of the camera-coordinate system image into the bird's-eye coordinate system image;

generate a speed plan indicating a future target speed of the mobile object based on a corrected curvature; and cause the mobile object to travel according to the speed plan by controlling a driving force output device of the mobile object to output a driving torque to drive wheels, controlling a brake device of the mobile object to output a brake torque to the drive wheels, or controlling a steering device of the mobile object to change orientations of steered wheels of the mobile object, wherein the correction filter sets an upper limit value of the second curvature to a first value for each point on the target trajectory a distance less than a predetermined distance from the mobile object, and sets the upper limit value to a second value, less than the first value, for each point a distance greater than or equal to the predetermined distance from the mobile object.

2. The mobile object control device according to claim 1, wherein the processor generates the speed plan such that a horizontal acceleration of the mobile object is a predetermined value under a condition of the corrected curvature.

3. The mobile object control device according to claim 1, wherein the processor calculates, when a speed of the mobile object is larger than the target speed, a distance necessary for deceleration from the speed to the target speed, and decelerates the mobile object such that the mobile object reaches the target speed within a range of the calculated distance.

4. A mobile object control method to be executed by a computer, the mobile object control method comprising:

generating a target trajectory indicating a path along which a mobile object is to travel in the future based on division line information represented in a space obtained by converting a camera-coordinate system image, which is photographed by a camera mounted on the mobile object and represents a surrounding situation of the mobile object, into a bird's-eye view coordinate system image;

calculating, as a calculated curvature, a first curvature of the target trajectory;

estimating, as an estimated curvature, a second curvature by applying a correction filter for correcting an error of the calculated curvature to the estimated curvature, the error being caused by conversion of the camera-coordinate system image into the bird's-eye view coordinate system image;

generating a speed plan indicating a future target speed of the mobile object based on a corrected curvature; and causing the mobile object to travel according to the speed plan by controlling a driving force output device of the mobile object to output a driving torque to drive wheels, controlling a brake device of the mobile object to output a brake torque to the drive wheels, or controlling a steering device of the mobile object to change orientations of steered wheels of the mobile object, wherein the correction filter sets an upper limit value of the second curvature to a first value for each point on the target trajectory a distance less than a predetermined distance from the mobile object, and sets the upper limit value to a second value, less than the first value, for each point a distance greater than or equal to the predetermined distance from the mobile object.

5. A non-transitory computer-readable storage medium storing a program for causing a computer to:

generate a target trajectory indicating a path along which a mobile object is to travel in the future based on division line information represented in a space obtained by converting a camera-coordinate system image, which is photographed by a camera mounted on the mobile object and represents a surrounding situation of the mobile object, into a bird's-eye view coordinate system image;

calculate, and a calculated curvature, a first curvature of the target trajectory;

estimate, as an estimated curvature, a second curvature by applying a correction filter for correcting an error of the calculated curvature to the estimated curvature, the error being caused by conversion of the camera-coordinate system image into the bird's-eye view coordinate system image;

generate a speed plan indicating a future target speed of the mobile object based on a corrected curvature; and cause the mobile object to travel according to the speed plan by controlling a driving force output device of the mobile object to output a driving torque to drive wheels, controlling a brake device of the mobile object to output a brake torque to the drive wheels, or controlling a steering device of the mobile object to change orientations of steered wheels of the mobile object, wherein the correction filter sets an upper limit value of the second curvature to a first value for each point on the target trajectory a distance less than a predetermined distance from the mobile object, and sets the upper limit value to a second value, less than the first value, for each point a distance greater than or equal to the predetermined distance from the mobile object.

* * * * *